United States Patent
Hogeboom et al.

(10) Patent No.: US 6,360,844 B2
(45) Date of Patent: Mar. 26, 2002

(54) AIRCRAFT ENGINE ACOUSTIC LINER AND METHOD OF MAKING THE SAME

(75) Inventors: William H. Hogeboom, Redmond; Gerald W. Bielak, Issaquah, both of WA (US)

(73) Assignee: The Boeing Company, Seattle, WA (US)

( * ) Notice: Subject to any disclaimer, the term of this patent is extended or adjusted under 35 U.S.C. 154(b) by 0 days.

(21) Appl. No.: 09/824,432

(22) Filed: Apr. 2, 2001

Related U.S. Application Data

(62) Division of application No. 09/079,677, filed on May 15, 1998, now Pat. No. 6,209,679, which is a division of application No. 08/662,456, filed on Jun. 13, 1996, now Pat. No. 5,782,082.

(51) Int. Cl.$^7$ .............................. B63H 11/10; F02K 1/00
(52) U.S. Cl. ................... 181/213; 286/292; 239/265.19
(58) Field of Search .................................. 181/213, 214, 181/286, 290, 292, 224; 60/226.1; 239/265.13, 265.17, 265.19

(56) References Cited

U.S. PATENT DOCUMENTS

| | | |
|---|---|---|
| 525,202 A | 8/1894 | Granjon et al. |
| 566,388 A | 8/1896 | Eschemann |
| 608,771 A | 8/1898 | Guilford |
| 2,870,857 A | 1/1959 | Goldstein |
| 3,011,584 A | 12/1961 | Lemmerman et al. |
| 3,021,565 A | 2/1962 | Bowman |
| 3,053,720 A | 9/1962 | Edds |
| 3,064,345 A | 11/1962 | Herman et al. |
| 3,077,947 A | 2/1963 | Peebles et al. |
| 3,095,943 A | 7/1963 | Kemp |
| 3,103,987 A | 9/1963 | Gildard, III et al. |
| 3,147,820 A | 9/1964 | Finger |
| 3,149,693 A | 9/1964 | Keller et al. |
| 3,166,149 A | 1/1965 | Hulse et al. |
| 3,211,253 A | 10/1965 | Gonzalez |
| 3,231,042 A | 1/1966 | Chapman |
| 3,249,659 A | 5/1966 | Voelker |
| 3,380,206 A | 4/1968 | Barnett |
| 3,477,231 A | 11/1969 | Paulson |
| 3,502,171 A | 3/1970 | Cowan |
| 3,508,838 A | 4/1970 | Martenson |
| 3,555,131 A | 1/1971 | Weismann |
| 3,670,843 A | 6/1972 | Kelley et al. |
| 3,734,234 A | 5/1973 | Wirt |

(List continued on next page.)

Primary Examiner—Khanh Dang

(57) ABSTRACT

A middle layer (22) having partitioned cavities (28) is sandwiched between an imperforate sheet (24) and an optional perforate sheet (26) to form a low resistance acoustic liner (22). A preferred method of manufacture of the low resistance acoustic liner (20) uses aspects of the buried septum technique including placing an uncured imperforate septum (36) between a support layer (32) and a partitioned cavity middle layer (22), pressing the middle layer into the imperforate sheet (24) and through the support layer (32), curing the imperforate septum 36 to form the imperforate sheet (24), removing the support layer (32), and attaching a perforate sheet (26) of roughly at least 15% open area to the top side of the middle layer. A preferred embodiment of inner and outer linings (47), (49) is provided. Each lining includes a combination of annuluses of absorptive and/or low resistance liners (51), (53). A first arrangement of engine acoustic linings includes alternating sections of absorptive liner with low resistance acoustic liner, one after the other. The low resistance acoustic liner scatters low mode order noise into a range of noise orders, including both high and low mode order modes. The absorptive liner absorbs the high mode order noise and dissipates it as heat. A second arrangement of acoustic linings includes a splitter (70) having a portion formed of low resistance liner (72).

11 Claims, 5 Drawing Sheets

U.S. PATENT DOCUMENTS

| | | |
|---|---|---|
| 3,748,213 A | 7/1973 | Kitching et al. |
| 3,802,145 A | 4/1974 | Scanlon |
| 3,819,007 A | 6/1974 | Wirt et al. |
| 3,821,999 A | 7/1974 | Guess et al. |
| 3,910,374 A | 10/1975 | Holehouse |
| 3,913,702 A | 10/1975 | Wirt et al. |
| 3,948,346 A | 4/1976 | Schindler |
| 3,983,955 A | 10/1976 | Vasiljevic |
| 4,001,473 A | 1/1977 | Cook |
| 4,084,366 A | 4/1978 | Saylor et al. |
| 4,084,367 A | 4/1978 | Saylor et al. |
| 4,088,723 A | 5/1978 | Norton |
| 4,112,164 A | 9/1978 | Koss |
| 4,118,263 A | 10/1978 | Cook, Jr. |
| 4,257,998 A | 3/1981 | Diepenbrock, Jr. et al. |
| 4,265,955 A | 5/1981 | Harp et al. |
| 4,287,962 A * | 9/1981 | Ingard et al. ............... 181/224 |
| 4,291,078 A | 9/1981 | Lyons |
| 4,291,080 A | 9/1981 | Ely et al. |
| 4,301,890 A | 11/1981 | Zalas |
| 4,335,174 A | 6/1982 | Belko |
| 4,421,201 A | 12/1983 | Nelsen et al. |
| 4,433,021 A | 2/1984 | Riel |
| 4,522,859 A | 6/1985 | Blair |
| 4,539,244 A | 9/1985 | Beggs et al. |
| 4,749,601 A | 6/1988 | Hillinger |
| 4,817,756 A | 4/1989 | Carr et al. |
| 4,836,469 A | 6/1989 | Wagenfeld |
| 4,931,340 A | 6/1990 | Baba et al. |
| 5,041,323 A | 8/1991 | Rose et al. |
| 5,151,311 A | 9/1992 | Parente et al. |
| 5,175,401 A * | 12/1992 | Arcas et al. ............... 181/292 |
| 5,180,619 A | 1/1993 | Landi et al. |
| 5,445,861 A | 8/1995 | Newton et al. |
| 5,702,231 A | 12/1997 | Dougherty |

\* cited by examiner

AIRCRAFT ENGINE ACOUSTIC LINER AND METHOD OF MAKING THE SAME

CROSS REFERENCE TO RELATED APPLICATIONS

This application is a continuation of U.S. patent application Ser. No. 09/079,677, filed May 15, 1998, now U.S. Pat. No. 6,209,679, which is a divisional of U.S. patent application Ser. No. 08/662,456, filed Jun. 13, 1996, now U.S. Pat. No. 5,782,082, both of which are hereby incorporated by reference in their entirety.

FIELD OF THE INVENTION

The present invention relates to noise dissipation panels, and more particularly to acoustic liners and arrangements of liners in aircraft engines and surrounding surfaces.

BACKGROUND OF THE INVENTION

Aircraft engine noise is a significant problem in high population areas and other noise controlled environments. Attempts currently focus on lining the aircraft engine nacelle and surrounding engine areas with acoustic liners to reduce the amount of noise radiating to the community.

As background information regarding general engine acoustic theory, there exists a linearized wave equation that describes the acoustic pressure distributions present in an airflow duct. This wave equation has a general solution given by a superposition (i.e., discrete summation) of eigenfunctions. Eigenfunctions vary with the boundary conditions at the duct wall, i.e., the wall's impedance. There are an infinite number of such eigenfunctions, each with an associated eigenvalue, that are referred to as the "modes of propagation", or "modes" for short. In general, low order modes have eigenvalues that are low in absolute value. High order modes have eigenvalues that are high in absolute value. Typical low mode order values for aircraft engine noise are 0 to 5, though the range will change depending on frequency, duct size, etc. Typical high mode order values for aircraft engine noise are 8 to 15, though, these will also vary.

As used in the discussions below, the term "low mode order noise" is meant to describe noise waves that are represented mathematically by relatively low absolute value eigenvalues with respect to the range of noise modes present in a given application. When viewed physically, the order of mode corresponds generally to the angle of wave propagation in the duct relative to the duct walls. As shown in FIG. 1, engine noise wavefronts 12 propagate along the duct 13 at various angles $\theta$ relative to the duct walls 14. If the angle is zero, the wave is said to be a fundamental wave 15, i.e., $\theta = \theta_f = 0$. Fundamental waves have wavefronts that travel in the axial direction of the duct and have a uniform pressure distribution at any particular duct cross-section.

In addition to fundamental waves, there are non-fundamental noise wavefronts which reflect back and forth between the duct walls as the wavefronts travel along the duct. These non-fundamental wavefronts create a non-uniform pressure distribution across the duct cross-section. The non-fundamental waves are generally classified according to their angular directions relative to the duct walls. Low order modes of noise propagation have wavefronts 16 oriented at small angles as measured relative to the duct walls, i.e., $\theta = \theta_l \leq$ approximately 30 degrees. High order modes of noise propagation have wavefronts 17 oriented at relatively larger angles as measured from the duct walls, i.e., $\theta = \theta_h \geq$ approximately 60 degrees. A wide range of noise frequencies exists for each mode order, low or high. For further discussion of theoretical considerations, see *Aeroacoustics of Flight Vehicles*, by Harvey H. Hubbard, published for the Acoustical Society of America through the American Institute of Physics, 1995. See also, *Theoretical Acoustics*, by Philip M. Morse et al., McGraw-Hill Book Company, dated 1968.

In a given aircraft application, an engine will generate both high and low mode order noise. Current design practice focuses on reducing this noise through the use of absorptive acoustic liners. Absorptive liners are known in various configurations, including the use of a honeycomb core sandwiched between an imperforate sheet and a perforate sheet having a small amount of open surface area. This particular combination is sometimes referred to as a single degree of freedom absorptive acoustic liner.

Absorptive liners are successful because pressure waves cause air to pass into and out of the openings of the perforate sheet and to experience a sufficient amount of friction, or resistance, which is dissipated as heat energy. The overall impedance of an acoustic liner is a complex number, given by a real part, the resistance, and an imaginary part, the reactance. Resistance relates to the liner's ability to dissipate noise energy as heat. Reactance relates to the liner's tendency to react noise energy back onto itself. Absorptive liners provide moderate resistance and low reactance for high mode order noise waves.

FIG. 2 illustrates the theoretical effect of using absorptive liners for a hypothetical case. A given total noise energy 18 is initially comprised of a combination of one low and one high mode order noise 19, 21, each having equal energy. Starting at the beginning of the duct at position 0, the total noise energy 18 encounters an absorptive liner that quickly reduces the high mode order noise 21 and more slowly reduces the low mode order noise 19. Since high mode order noise attenuates quickly in the duct, only a relatively short duct length is needed to dissipate most of the high mode order noise present. In FIGS. 2 and 3, the vertical axis is logarithmic. A change of about −3 dB, for example, refers to a reduction in noise energy of about half The horizontal axis is normalized to be dimensionless. The exact values of the information shown in FIGS. 2 and 3 will vary according to the characteristics of a particular application, and in general there will be energy in more than two modes.

As is evident by FIG. 2, absorptive liners are very effective for absorbing high mode order noise 21, but are inefficient for reducing low mode order noise 19, i.e., those noise wavefronts traveling along the duct at a low angular displacement relative to the duct walls. Propagating at low angles, these low order modes strike the absorptive liners fewer times in a given length of duct. Therefore, to reduce all of the low mode order noise requires a greater length of acoustic lining than is typically possible in the space-limited regions of aircraft engines. Noise reduction from use of absorptive liners is thus practically limited to higher mode order noise.

Thus, a need exists for an acoustic liner, or arrangement of liners, that effectively reduces both high and low mode order noise. The present invention is directed to fulfilling this need.

SUMMARY OF THE INVENTION

The present invention provides a new type of acoustic liner and arrangement of liners specifically for use in dissipating low mode order noise. This new liner is termed a low resistance acoustic liner and includes a middle layer, or core layer, having partitioned cavities. The cavities aid in scattering a large amount of low mode order noise into higher mode order noise. An imperforate sheet is attached to one side of the middle layer. A perforate sheet having a large open surface area is optionally attached to the middle layer, opposite the imperforate sheet, so that the partitioned cavities of the middle layer are substantially sandwiched between the imperforate and the perforate sheets. The perforate sheet stops the whistling effect caused by high speed air flowing into the cavities and minimizes airflow drag as may be required for some applications, e.g., in aircraft engines. The preferred middle layer material for high-speed commercial aircraft engines is honeycomb core having cavities with axes preferably oriented perpendicular to the central plane of the core.

In accordance with further aspects of the invention, the preferred middle layer cavity depth is approximately one quarter the noise wavelength sought to be reduced. The middle layer cavities may also be comprised of cavities having varying depths. The preferred average diameter of each middle layer cavity is equal to or less than approximately one tenth the noise wavelength. For noise having wavelengths from 3 to 12 inches, the cavity depth is between roughly 0.75 and 3 inches, and the cavity average diameter is between roughly 0.3 to 1.2 inches.

In accordance with other aspects of the invention, the perforate sheet includes uniformly distributed openings. The percent open area of the perforate sheet is preferably in an amount of at least 15% the entire perforate sheet surface area. These openings are preferably holes that have diameters less than the average cavity diameter. The low resistance acoustic liner has an absorption coefficient of about 0 to 0.5, the preferred value being less than 0.5. The low resistance acoustic liner has a resistance coefficient of about 0 $\rho c$ to 0.5 $\rho c$, the preferred value being 0.3 $\rho c$.

In accordance with yet further aspects of the invention, a preferred method of manufacturing a low resistance acoustic liner having cavities of constant depth includes attaching the imperforate sheet to one side of the middle layer using an adhesive. The perforate sheet is attached to the opposite side of the middle layer also using an adhesive.

In accordance with yet other aspects of the invention, a preferred method of manufacture for creating cavities of varying depth includes providing a support layer of hardened wax-like material, placing an uncured imperforate septum on top of the support layer, placing a middle layer formed of a partitioned cavity material (e.g., honeycomb core) on top of the uncured imperforate septum, and using a uniform force to press the middle layer through the septum and the support layer until the septum is located at a desired cavity position. The septum is cured to form the imperforate sheet. After curing, the support layer is removed, such as by melting, and a perforate sheet is optionally attached to the side of the core opposite the cured septum.

In accordance with still further aspects of the invention, the desired imperforate septum material is a thermoplastic, resin, rubber, or rubber-like film material with which the middle layer can be used to "cookie-cut" during pressing and that which can be later cured to form a seal within each cavity. The preferred support layer material is wax. The support layer is of varying cross-sectional thickness in order to cause the imperforate sheet to be located at different heights within the middle layer cavities. A mating layer may be optionally used to aid in supporting the middle layer as it is forced through the uncured imperforate septum and support layer. The mating layer is placed between the uncured imperforate septum and the middle layer prior to pressing. The surface shapes of the mating layer and the support layer are matched. The method of making a low resistance acoustic liner may optionally include the step of warming the support layer prior to pressing so that the support layer may be more easily cut by the middle layer.

In accordance with still other aspects of the invention, a first embodiment of acoustic liners includes inner and outer linings formed of alternating low resistance liners with absorptive liners. The liners are positioned side-by-side and extend within an airflow duct for a length as necessary or as space allows. It is preferable that an absorptive liner initially precede the first low resistance liner. The liners may be formed to replace duct walls or may be attached directly to the existing duct walls. All liners are placed with their imperforate sheets located farthest from the airflow. The low resistance acoustic liner surface area adjacent the airflow is sized approximately 5% to 25% the size of the absorptive liners. For circular engine locations such as in the bypass duct surrounding an turbofan engine core, the liners are formed as annuluses.

In accordance with yet additional aspects of the invention, a second embodiment of acoustic liners includes inner and outer linings with a splitter positioned generally mid-way between the linings. The splitter may be formed entirely of low resistance acoustic liner or may formed as a combination of both low resistance liner and absorptive liner. For circular engine locations, it is preferable to use annular liners attached to surrounding engine structures using conventional attachment methods.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein.

DETAILED DESCRIPTION OF THE PREFERRED EMBODIMENT

The discussion below first focuses on a description of the theory underlying the present invention low resistance acoustic liner and a description of its preferred configuration and method of manufacture. This is followed by a description of two particularly useful arrangements of liners for use with modern aircraft engines. These arrangements are generally constructed by placing alternating sections of absorptive liner with low resistance acoustic liner, one after the other, lengthwise within the engine. The low resistance acoustic liner scatters low mode order noise into a range of noise orders, including some high order modes. The adjacent downstream absorptive liner absorbs the high mode order noise and dissipates it as heat. This arrangement of low resistance acoustic liner followed by absorptive liner is repeated as many times as space allows, or as necessary.

With regard to the underlying theory of how low resistance acoustic liners work, it is our belief that low mode order noise waves react with the low resistance acoustic liner and become scattered into both high and low mode order noise. The low resistance acoustic liner offers impedance that includes a small real resistance term as well as a small imaginary reactance term. Near zero impedance, or at least <0.5 ρc, appears to cause a portion of the low mode order noise to be scattered into high mode order noise (where ρ is the density of the air, and c is the speed of sound in the air). This newly created high mode order noise may then be absorbed by downstream absorptive acoustic liners.

Figure 1:
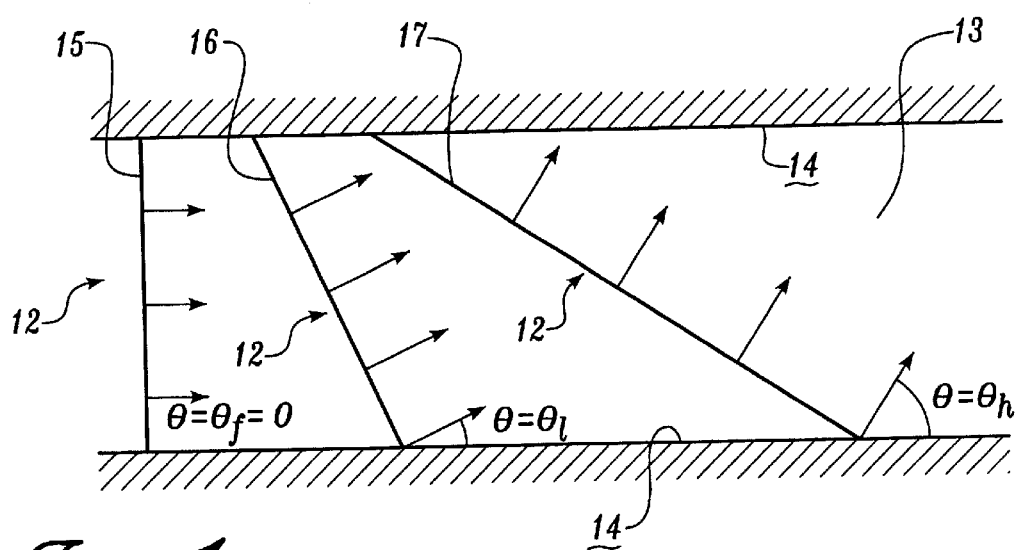
FIG. 1 is a diagrammatic side elevation illustrating noise wave propagation in a duct.
Figure 2:
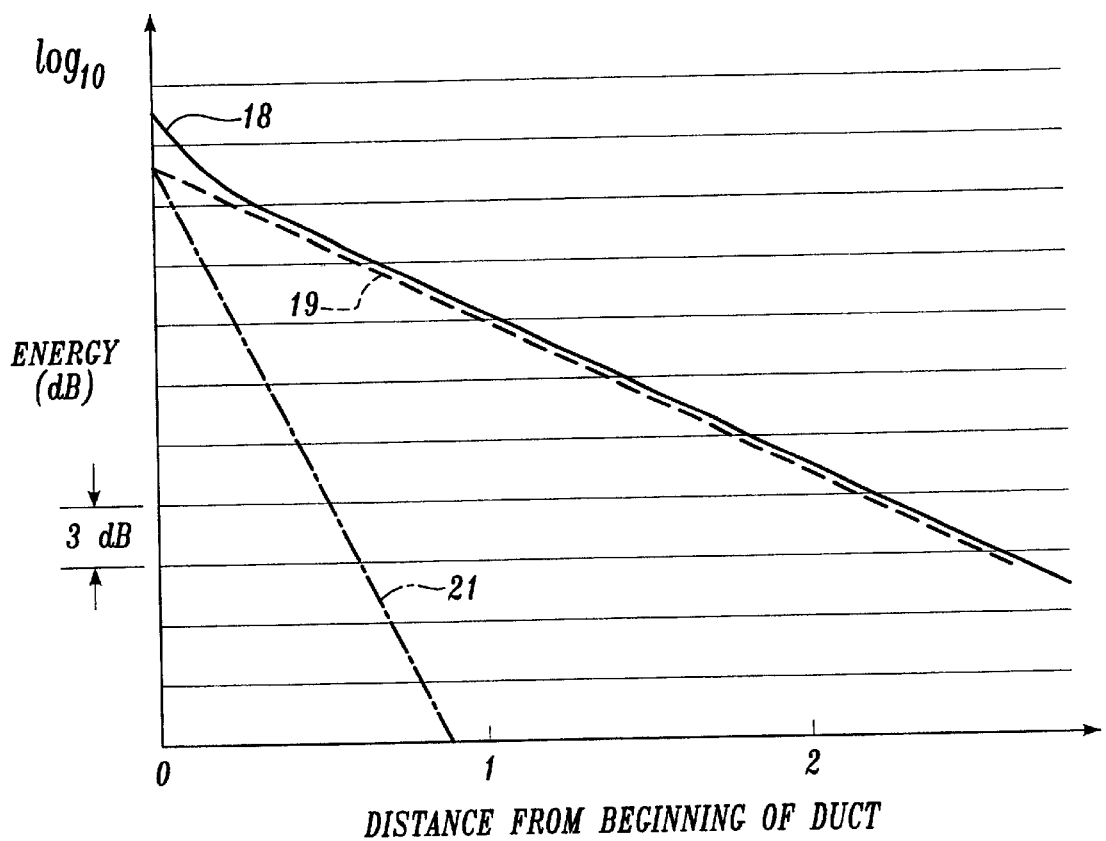
FIG. 2 is a chart illustrating theoretical reduction in noise energy relative to duct length when using absorptive acoustic liners.
Figure 3:
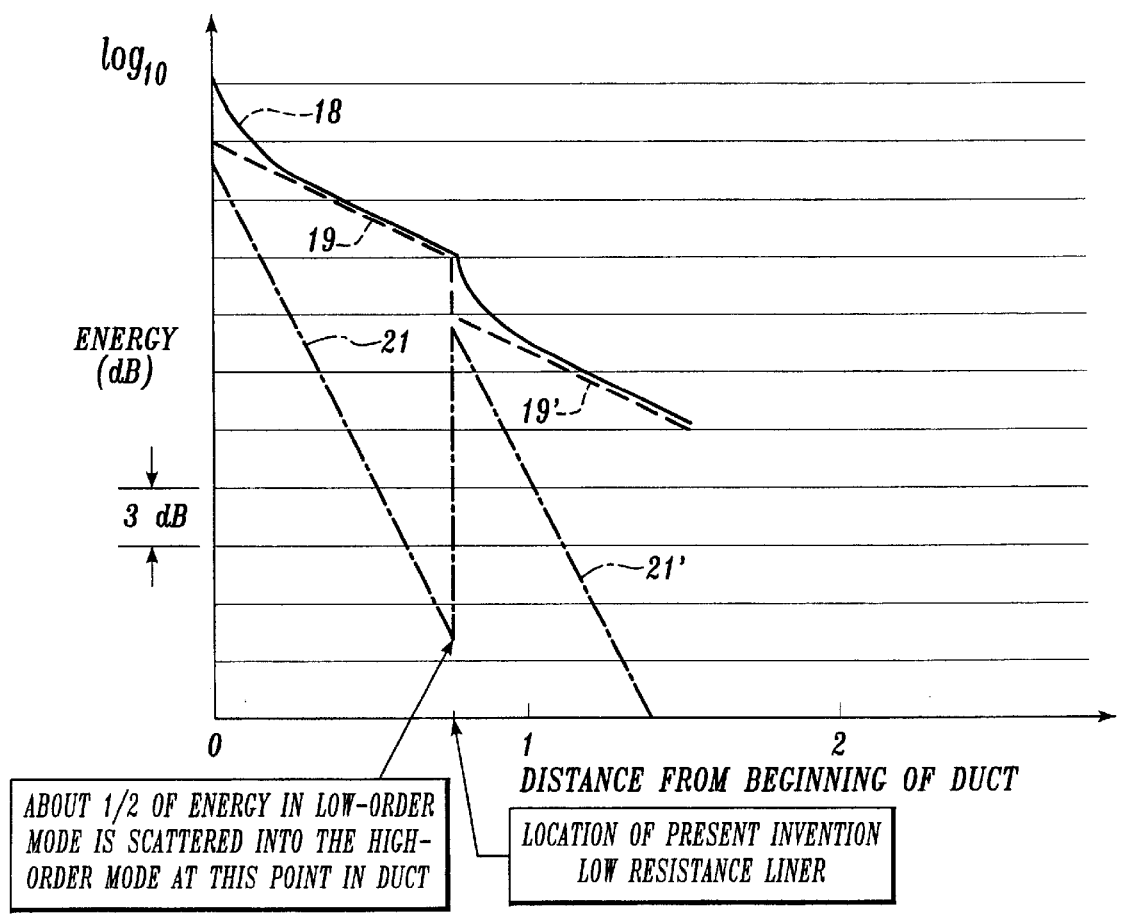
FIG. 3 is a chart illustrating theoretical reduction in noise energy relative to duct length when additionally using a low resistance acoustic liner formed in accordance with the present invention.

Referring to theoretical FIG. 3, the total energy 18 is initially reduced primarily by a reduction in high mode order noise 21 from use of a first absorptive liner. Upon encountering a low resistance acoustic liner formed in accordance with the present invention, roughly half the low order mode energy 19 is scattered into high mode order noise 21', with half remaining as low mode order noise 19'. A second absorptive liner absorbs the newly formed high mode order noise 19'. This process is continued as space allows. In this manner, the total noise energy is "ratcheted" down to values unattainable by use of absorptive acoustic liners only.

Figure 4:
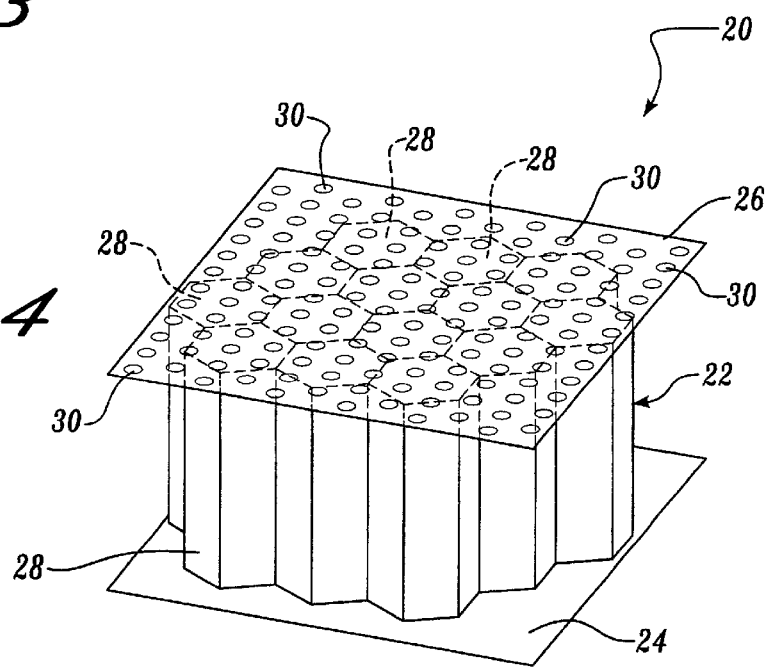
FIG. 4 is a fragmentary top perspective of a low resistance acoustic liner formed in accordance with the present invention.

FIG. 4 shows a low resistance acoustic liner 20 of the present invention that includes a middle layer, or core layer, 22 generally sandwiched between an imperforate sheet 24 and a perforate sheet 26. The middle layer 22 is formed of a material having partitioned cavities 28 therein. Low mode order noise enters the middle layer cavities and exits as a range of modes. Thus, the cavities 28 "capture" large amounts of low mode order noise and scatter it outward into both high and low mode order noise. The low resistance acoustic liner 20 has an absorption coefficient of about 0 to 0.5, the preferred value being less than 0.5. The low resistance acoustic liner 20 has a resistance coefficient of about 0 ρc to 0.5 ρc, the preferred value being 0.3 ρc The present invention may be practiced without a perforate sheet. The perforate sheet 26 serves to stop the whistling effect caused by air that would otherwise be flowing rapidly over and into the cavities. The perforate sheet also serves as a smooth, flow-directing surface that minimizes drag within the airflow duct from air interacting with the low resistance liner. When a perforate sheet 26 is used, a plurality of holes 30 should be formed therethrough. The percent open area of the perforate sheet 26 due to the holes 30 is preferably in the range of about 15–75% of the entire sheet surface area. The holes 30 are sized less than the average diameter of each cavity. At these higher open area percentages, it has been discovered that the perforate sheet stops the whistling effect and minimizes airflow drag while still allowing sufficient amounts of low mode order noise to enter the cavities and exit in the form of both high and low mode order noise.

Known configurations of absorptive liners also include a perforate sheet having a plurality of holes therethrough. See, for example, U.S. Pat. No. 4,433,021. Actual total open area amounts for absorptive liners varies between approximately 5%–15%. Absorptive liners, however, rely on the open area perforations to purposefully manipulate the noise wave propagation in such a way as to encourage its dissipation. As stated above, the present invention perforate sheet holes 30 are not concerned with noise dissipation, but rather the avoidance of whistling and airflow drag.

Another type of prior art liner utilizes a layer of open weave to supply friction to noise waves for dissipation. See, for example, U.S. Pat. No. 4,433,021. These liners sometimes use a perforate sheet to provide structural support for the layer of open weave. These liners include perforate sheet layers with open areas between 15%–35%. Higher percent open area values, however, are not desirable since the strength is diminished as the open area increases. The present invention is not directly concerned with noise dissipation by absorptive liner alone, but is instead concerned with scattering noise while avoiding whistling and airflow drag in order to promote dissipation by an absorptive liner.

Still referring to FIG. 4, representative middle layer materials include honeycomb core, Flexcore™, fluted core, etc. The preferred middle layer material for high-speed commercial aircraft engines is honeycomb core having partitioned cavities with axes substantially perpendicular to the general plane of the core. A preferred cavity depth is approximately one quarter the wavelength of the noise sought to be reduced. This size provides zero pressure at the cavity entrance and maximum particle velocity at the imperforate sheet. To increase scattering for a given frequency or for applications having multiple frequencies present in the low mode order modes, cavity depth may be made to vary from cavity to cavity. At least one type of variable depth cavity has been found to provide superior results. This embodiment is discussed in detail below with reference to FIG. 6.

The optimum cavity width is relatively small as compared to the wavelength of the noise that is to be reduced, a nominal value being one tenth the wavelength. By way of example, for noise having wavelengths from 3 to 12 inches, the cavity depth is between about 0.75 and 3 inches, and the cavity average diameter is between about 0.3 to 1.2 inches. As will be appreciated by those skilled in the art, the overall middle layer dimensions will thus vary according to the needs of a particular application, the above dimensions being provided as examples only and not intended to be limiting.

The imperforate and perforate sheets 24, 26 may be formed by any one of a number of known materials, e.g., aluminum, fiber glass, composites, etc. The perforate sheet 26 is attached to the middle layer 22 using suitable conventional methods, such as gluing. It is attached to that side of the middle layer that is to be lying adjacent the engine airflow. The imperforate sheet 24 may be attached to the middle layer 22 also using conventional methods. For example, an imperforate sheet may be simply adhered to the middle layer using adhesives. The imperforate sheet 24 is positioned generally on, or near, that side of the middle layer which is opposite the perforate sheet 26.

One method for creating cavities of varying depths is to simply cut the middle layer surfaces in the desired contour prior to attaching imperforate and perforate sheets thereto. A preferred method for creating cavities of varying depths, is by using the buried septum technique. This method is a preferred method because it can allow for deeper middle layers that may provide a structural function, and this method can provide a solid connection of imperforate material to each middle layer cavity. The buried septum acoustic liner manufacturing technique is disclosed in U.S. Pat. No. 4,257,998 and U.S. Pat. No. 4,265,955, both incorporated herein by reference, to the extent consistent with the present specification. This method generally includes providing a support layer of hardened wax-like material, placing an uncured perforated septum on top of the support layer, placing a partitioned cavity material (e.g., honeycomb core) on top of the uncured septum material, and pressing the core through the septum and support layer until the septum is located at a desired cavity position. The septum is cured to cause it to adhere to the inner walls of each cavity at its selected height without restricting the septum perforations. The support layer is removed, such as by melting. A perforate sheet is glued to one side of the core, and an imperforate sheet is glued to the opposed core side. The result is, effectively, the formation of two perforated cavity layers from a single core. One layer is formed between the perforate sheet and the perforated septum, the other between the perforated septum and the imperforate sheet.

Figure 5:
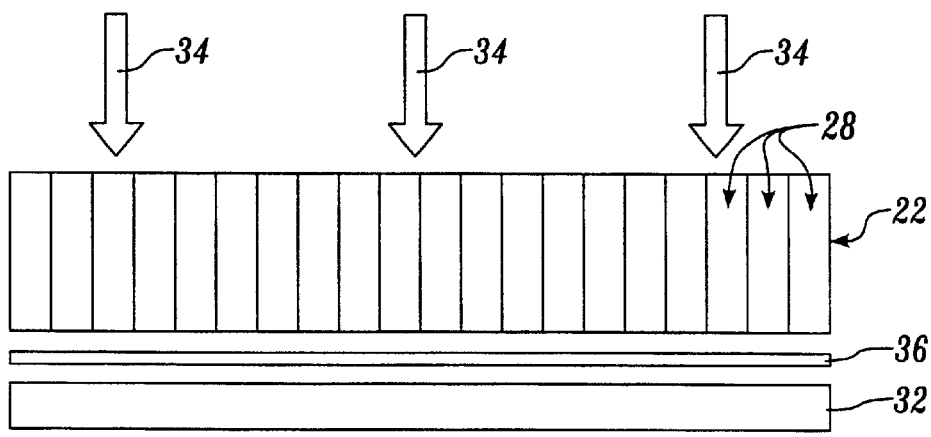
FIG. 5 is a side elevation illustrating a method of forming a low resistance acoustic liner formed in accordance with the present invention, including a bottom support layer, a deformable septum, and a partitioned core.
Figure 9:
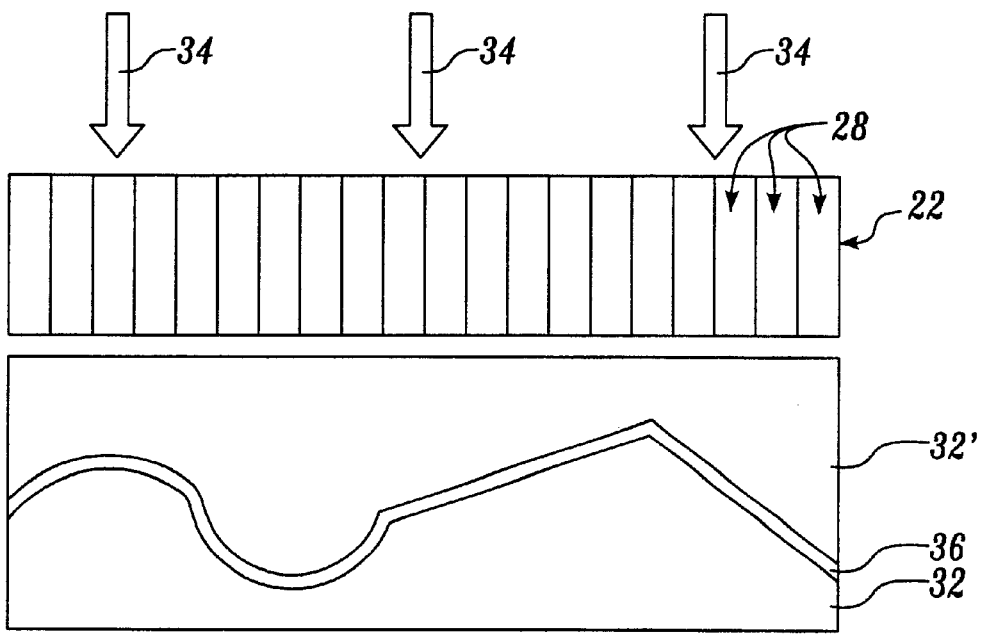
FIG. 9 is a side elevation illustrating the method of forming a low resistance acoustic liner of FIG. 5 utilizing the mating layers and imperforate septum of FIG. 8.

With regard to the present invention low resistance acoustic liner, an altered buried septum technique is used, as shown schematically in FIG. 5. An uncured imperforate septum 36 is placed between a support layer 32 and the partitioned cavity middle layer 22. A uniform force is provided to press the middle layer through the imperforate sheet 24 and into the support layer 32. The force is represented in FIGS. 5 and 9 as arrows 34. After the uncured imperforate septum 36 is pushed to the desired cavity location, the uncured imperforate septum 36 is cured to form the imperforate sheet 24 discussed above. Using this technique, the imperforate sheet 24 is easily and permanently adhered to the inner walls of the middle layer cavities 28. The support layer 32 is removed, e.g., by melting. The present invention low resistance acoustic liner 20 is optionally provided with a perforate sheet 26 having at least 15% open area. A preferred range of open area is between roughly 15%–75%.

Because there is no need to form two perforated cavity layers in the low resistance acoustic liner (as there is in the absorptive liners of the '998 and '955 patents), the support layer 32 does not need to be very thick. The height of the support layer determines only the location at which the uncured imperforate septum 36 will adhere to a cavity wall. After the imperforate septum is cured, the portion of the middle layer extending beyond the septum may be used as support structure or used in attaching the low resistance acoustic liner to a surface. Alternatively, the extending portions may be removed entirely (e.g., via cutting, sanding, grinding, etc.)

In this manner, the buried septum technique is altered in order to provide an efficient method of forming what is basically a bottom surface to each low resistance acoustic liner middle layer cavity 28. This method for inserting an imperforate septum within the middle layer may be applied whenever the desired imperforate septum material is preferably of a thermoplastic, resin, rubber, or rubber-like film material to which the middle layer 22 can be used to "cookie-cut" the septum material during pressing and that which may be later cured to form a seal within each cavity 28. A preferred support layer 32 is wax.

Figure 6:
FIG. 6 is a side elevation of a first variation of the support layer of FIG. 5.
Figure 7:
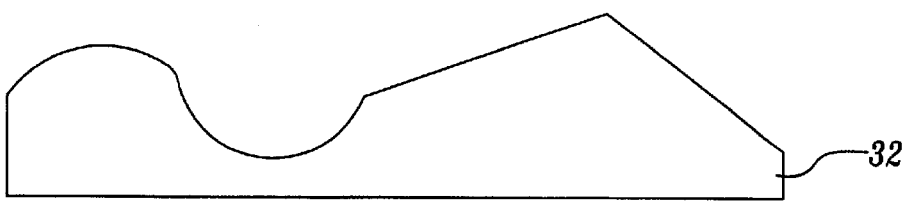
FIG. 7 is a side elevation of a second variation of the support layer of FIG. 5.

In the embodiment shown in FIG. 6, the cross-sectional shape of the support layer 32 is a simple wedge. The cross-sectional shape of the support layer 32 of FIG. 7 is a more complicated contour including inclinations, declinations, concave curves, and convex curves. When inserted into the middle layer 22, the imperforate sheet 24 will be located according to the height of the support layer cross-section at that position. The present invention encompasses using virtually any conceivable cross-sectional shape. The optimal shape will depend on the design considerations of a particular application.

The scattering efficiency of low resistance acoustic liners is a function of whether the proper liner cavity depth is present for a particular frequency. Because there are multiple frequencies in low mode order engine noise, the imperforate sheet should be preferably attached to the middle core at varying heights in order to enhance the range of frequencies affected and the modes scattered by the liner. The optimum support layer shape is a wedge, as shown in FIG. 6. The preferred wedge angle of inclination is between about 30 to 60 degrees. The wedge should ultimately be oriented in the duct such that cavity depth decreases in the direction of noise propagation. This wedge cavity depth variation also enhances scattering relative to the ¼ λ constant cavity depth liner at a single frequency. This is apparently because the wedge cavity acts as a better "reflector" at scattering noise into higher mode order than occurs without the wedge shape.

Figure 8:
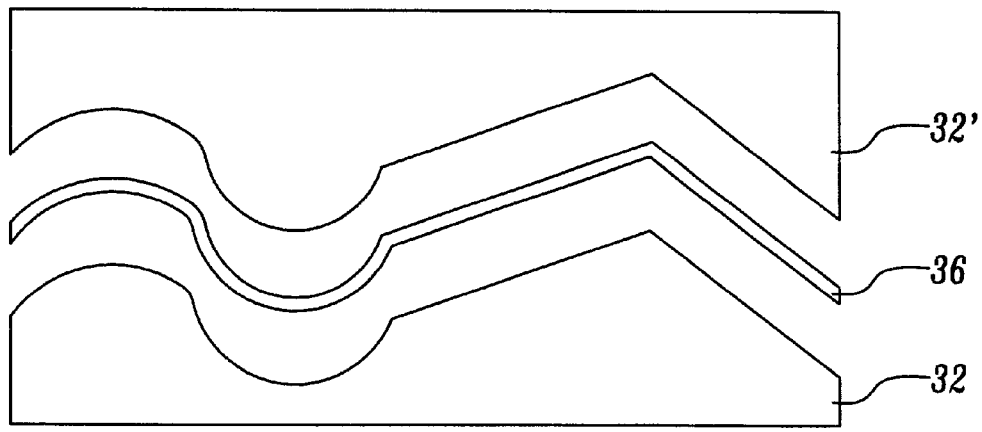
FIG. 8 is a side elevation of an alternative method of forming a support layer in accordance with the present invention, using mating layers and an imperforate septum.

Minor distortions of the septum and/or cavities because of non-uniform stresses during pressing are not critical to the acoustic performance of the low resistance acoustic liner. If more significant forces or distortions are present, as would be the case for a support layer having a very complex cross-sectional shape, the above method may be further altered as shown in FIGS. 8 and 9. In particular, after placing an uncured imperforate septum 36 on top of the support layer 32, a mating layer 32' is placed on top of the uncured imperforate septum 36. Thus, the imperforate septum is held firmly between the mated layers 32 and 32'. Pressing and curing is done as usual, with the middle layer 22 core being inserted from the top surface of the mating layer 32', as illustrated in FIG. 9. The step of removing the support layer is also accomplished as described above, with the addition of removing the mating layer as well. As will be readily appreciated by those skilled in the art, this alternative method of construction provides additional structural support for the septum 36 and middle layer 22 as the middle layer is forced through the layers 32, 32' and the uncured imperforate septum 36.

Figure 10:
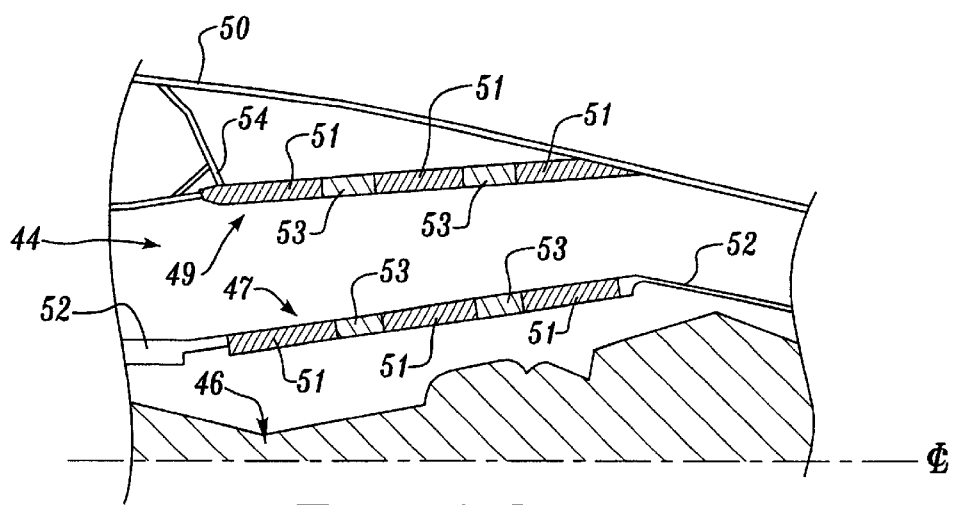
FIG. 10 is a side elevation of a portion of an aircraft engine with parts broken away for illustrative purposes, showing a first arrangement of acoustic liners formed in accordance with the present invention.

FIG. 10 is a side elevation of a portion of an aircraft engine with parts broken away for illustrative purposes, showing an arrangement of acoustic liners positioned circumferentially about an engine core 46 of a turbofan engine within a bypass duct 44 defined generally by an outer structure 50, such as a fairing or nacelle, and an engine casing 52. The arrangement generally includes inner and outer linings 47, 49. The linings of FIG. 10 include alternating annuluses, or rings, of absorptive liner 51 and low resistance liner 53 preferably connected end-to-end using conventional methods, e.g., gluing, connecting with brackets, etc. The creation of alternating absorptive and low resistance liners may alternatively be constructed by using a single liner having distinct regions of low open surface area (to act as the absorptive liner) and high open surface area (to act as the low resistance liner). Each low resistance acoustic liner annulus 53 scatters low mode order noise into a range of noise orders, including some high order modes. The high mode order noise is absorbed by adjacent absorptive liners 51. The low resistance liners are formed using the methods described above. The annuluses may be formed either as a single piece or as a combination of joined arcs, wherein each arc is formed separately. Other methods of forming the linings 47, 49 may be used, such as attaching the liners directly to a single annular backing. This method is not preferred because it adds unnecessary weight.

The inner and outer linings 47, 49 may be formed to replace an existing duct wall, may be attached directly to an existing duct wall, or may be connected between stationary structures to define a new duct wall. Shown in FIG. 10, the outer lining 49 defines a duct wall where none previously existed, while the inner lining 47 replaces a portion of the pre-existing engine casing 52. Shown in FIG. 10, the forwardmost edge of the outer lining 49 is connected to a radial flange 54 using conventional techniques, e.g., fasteners, brackets, etc. The aftmost edge of the outer lining 49 is connected directly to the outer structure 50. The inner lining 47 connects to the remaining portion of the casing 52.

Still referring to FIG. 10, it is recommended to use an absorptive liner as the first liner encountered relative to the direction of noise propagation. Such an initial absorptive liner immediately absorbs a quantity of high mode order noise, leaving the downstream liners to address attenuation of low mode order noise. As many alternating liners are provided as necessary, or until the aft end of the engine nacelle is reached. All liners are placed with their perforate sheet facing the region of airflow. The preferred liner surface area lying adjacent to the airflow is such that the annulus of low resistance acoustic liner 53 is actually shorter in length than its downstream adjacent annulus of absorptive liner 51. A range of acceptable ratios is between about 5% to 1% (i.e., the low resistance liner surface area is about 5–25% that of the absorptive liner surface area), with 15% being generally sufficient. This is because low resistance acoustic liners are needed to scatter low mode order noise modes, which requires a relatively short distance. The absorptive liners, that actually perform the task of dissipating the higher order noise modes, require relatively more distance.

Figure 11:
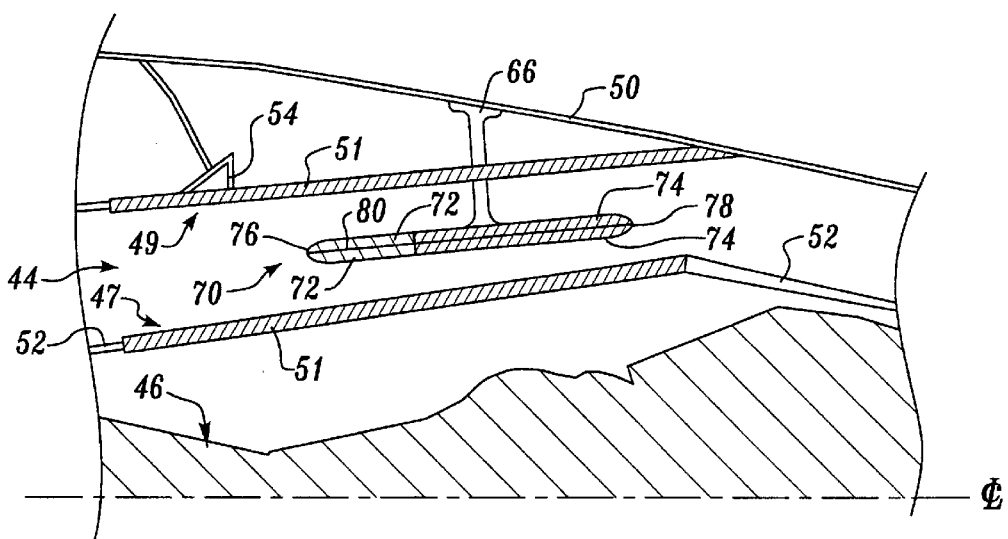
FIG. 11 is a side elevation of a portion of an aircraft engine with parts broken away for illustrative purposes, showing a second arrangement of acoustic liners formed in accordance with the present invention.

FIG. 11 is a side elevation of a portion of an aircraft engine with parts broken away for illustrative purposes, showing a second arrangement of acoustic liners, also located within the bypass region of a turbofan engine. The inner and outer linings 47, 49 of FIG. 10 are formed entirely of an annulus of absorptive liner 51. A splitter 70 having at least one portion formed from low resistance liner is included. For this arrangement, it is recommended to place a portion of the inner and outer linings forward of the splitter 70. In this way, high mode order noise is initially absorbed by the inner and outer linings leaving the remaining arrangement to reduce low mode order noise.

The splitter 70 should include aerodynamically efficient leading and trailing edges 76, 78, and should be relatively short in length as compared with the overall duct length. The splitter 70 is preferably annular and is positioned mid-way between the outer and inner linings in order to balance the noise lessening capabilities between opposed splitter sides. Conventional components are used to secure the splitter to a stationary engine structure. In FIG. 11, a plurality of radial brackets 66 connects the splitter 70 to the outer structure 50 by extending through openings in the outer lining 49 and bolting to the outer structure. Any one of a number of known splitter attachment methods may be used.

The splitter of FIG. 11 includes a first section formed of two low resistance liners 72 positioned back-to-back such that their imperforate sheets are adjacent one another. In FIG. 11, line 80 indicates the general location of the adjacent imperforate sheets. For weight savings, it is recommended that a single imperforate sheet be used and shared between the adjacent low resistance liner annuluses 72. The low resistance liners 72 of the splitter 70 precede a section of absorptive liners 74. This arrangement of low resistance liner with absorptive liner may be repeated.

Figure 12:
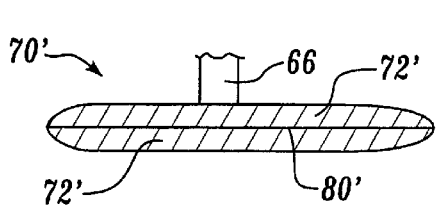
FIG. 12 is a side detail illustration of a first alternative embodiment of a splitter formed in accordance with the present invention.
Figure 13:
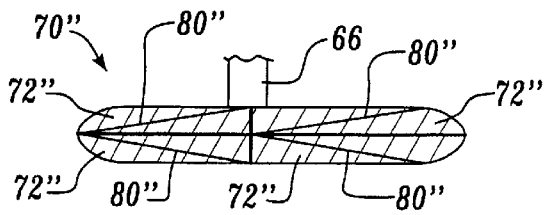
FIG. 13 is a side detail illustration of a second alternative embodiment of a splitter formed accordance with the present invention.

FIG. 12 is a side detail illustration of a first alternative annular splitter 70' formed entirely of low resistance liner material 72'. There are two low resistance liner annuluses shown in FIG. 12, though, a different number may be used. Line 80' indicates the general location of the adjacent (or shared) imperforate sheets. FIG. 13 is a side detail illustration of a second alternative of an annular splitter 70" formed entirely of low resistance liner having cavities with varying depths. There are four separate low resistance liners shown in FIG. 13, though again, a different number may be used. Line 80" indicates a linear inclination to each imperforate sheet, thus providing cavities of various depths.

While the preferred embodiment of the invention has been illustrated and described, it will be appreciated that various changes can be made therein without departing from the spirit and scope of the invention. For example, the present invention low resistance liner may be used in various engine locations, not just in the bypass duct of a turbofan engine. Likewise, the basic arrangement of providing low resistance liner to scatter low mode order noise, with absorptive liner to absorb high mode order noise, may be used in non-engine applications. In addition, the configuration aspects described above with regard to FIGS. 10–13 may be combined in various ways to suit a particular application.

What is claimed is:

1. A turbofan aircraft engine airflow duct having at least one acoustic liner material therein adapted for attenuating engine noise, wherein at least a portion of the liner is comprised of annular rings of at least two different materials, that are positioned in the airflow duct so that they alternate with respect to each other in the direction of the air flow, the materials including:

(i) an absorptive material adapted to absorb high mode order noise, and (ii) and a multi-layer low-resistance acoustic material adapted to scatter low mode order noise and having a resistance coefficient in the range of from 0 to 0.5 ρc, comprising a layer having a plurality of partitioned cavities, between an imperforate sheet and a perforate sheet, positioned in the airflow duct so that the perforate sheet is exposed to the air flow.

2. The airflow duct of claim 1 wherein the ratio of the surface area of low-resistance material to absorptive material, along the inner periphery of the liners in the duct, is in the range of from 1:20 to 1:4.

3. The airflow duct of claim 1 wherein the perforate sheet has an open area of at least 15 percent.

4. The airflow duct of claim 1 wherein the partitioned cavities are of a length approximately one quarter the wavelength of the engine low mode order noise.

5. The airflow duct of claim 1 wherein the partitioned cavities are of a length approximately one tenth the wavelength of the engine low mode order noise.

6. The airflow duct of claim 1 wherein the layer having a plurality of partitioned cavities is in the approximate shape of a wedge having an angle of from 30–60 degrees, and the low-resistance material is positioned in the airduct so that cavity depth decreases in the direction of noise propagation.

7. A jet aircraft engine airflow duct having at least one acoustic liner material therein adapted for attenuating engine noise, wherein:

(i) at least a portion of the liner is comprised of an absorptive material adapted to absorb high mode order noise, and (ii) a splitter having an elongated shape is positioned approximately in the middle of the duct, parallel to the direction of the air flow, and has a first and second section, the first section comprises (a) an absorptive material adapted to absorb high mode order noise, and is positioned downstream of (b) a multi-layer low-resistance acoustic material adapted to scatter low mode order noise and having a resistance coefficient in the range of from 0 to 0.5 $\rho c$, comprising a layer having a plurality of partitioned cavities, between an imperforate sheet and a perforate sheet, positioned in the airflow duct so that the perforate sheet is exposed to the air flow.

8. The airflow duct of claim 7 wherein the perforate sheet has an open area of at least 15 percent.

9. The airflow duct of claim 7 wherein the partitioned cavities are of a length approximately one quarter the wavelength of the engine low mode order noise.

10. The airflow duct of claim 7 wherein the partitioned cavities are of a length approximately one tenth the wavelength of the engine low mode order noise.

11. The airflow duct of claim 7 wherein the layer having a plurality of partitioned cavities is in the approximate shape of a wedge having an angle of from 30–60 degrees, and the low-resistance material is positioned in the airduct so that cavity depth decreases in the direction of noise propagation.

* * * * *